INVENTORS
James L. Hancock
BY Lee J. Lakes
D. C. Staley
ATTORNEY

United States Patent Office 3,100,933
Patented Aug. 20, 1963

3,100,933
METHOD OF COLD WELDING ALUMINUM MEMBERS
James L. Hancock, Fairborn, and Lee J. Lakes, Middletown, Ohio, assignors to General Motors Corporation, Detroit, Mich., a corporation of Delaware
Filed Oct. 15, 1956, Ser. No. 615,968
3 Claims. (Cl. 29—470.1)

This invention relates to capacitors and is particularly concerned with obtaining high electrical conductivity and mechanical strength between metal foil and terminal tabs which are pressure-fused to the foil.

Methods are known for applying terminal tabs of aluminum to aluminum foil for making capacitors as long as the gauge of the foil is at least .001 inch thickness or more. However, when foil gauge is less than .001 inch thickness, for example, in a range between .0008 inch to .00017 inch thickness, a serious problem arises in applying the tabs to the foil. Optimum mechanical strength achieved simultaneously with good electrical conductivity between tabs and such thin foil is a goal not realized with old methods.

A purpose and objective of this invention is to provide a new method of applying terminal tabs to thin capacitor foil.

Another object is to connect aluminum terminal tabs to very thin aluminum capacitor foil by a method wherein both the foil and tabs are purposely in an uncleaned and oxidized condition to aid in pressure fusing a joint therebetween having optimum mechanical strength and electrical conductivity.

Still another purpose is to eliminate surface cleaning as a step in applying terminal tabs to capacitor foil while deliberately filming a high density oxide layer onto surface area to be joined for aiding in achieving a good mechanical connection and electrical conductivity.

Also an object is to attach an aluminum terminal tab to an aluminum foil having a gauge ranging between .0008 inch and .00017 inch in thickness while attaining high electrical conductivity and maintaining mechanical strength throughout the foil and tab adjacent their connection.

Another objective is to pressure fuse a capacitor terminal tab of aluminum to a thin aluminum foil with an external, locally applied force upwards of 50 inch-pounds in small areas resulting in bonding of virgin aluminum by shattering effected upon a high-density, true dielectric film purposely applied therebetween to assure mechanical strength throughout the foil and tab simultaneously with high electrical conductivity.

Further objects and advantages of the present invention will be apparent from the following description, reference being had to the accompanying drawings wherein preferred embodiments of the present invention are clearly shown.

The drawings schematically show a new way of securing a terminal tab to thin capacitor foil. The following description and examples will relate the problems encountered with various known methods for applying tabs to foil and will show how the present invention overcomes the problems to provide superior mechanical strength and electrical conductivity as a result.

First of all, the present invention recognizes that in bonding a metal capacitor tab to foil, it is often not feasible to clean the surface areas properly on each of the parts to be joined. For instance, aluminum foil may be etched with suitable acid solutions or abrasively brushed to clean away dirt and unwanted oxides in exposing virgin metal for obtaining a good bond. Chemically etching a thin foil results in chemical disintegration of the foil at the very spot where the tab is to be connected. Etching or abrasive cleaning of thin foil can easily cause severe loss of mechanical strength by weakening or tearing into the foil due to thin gauge. It is well known that formation of aluminum oxide is nearly instantaneous after the so-called "scratching" or cleaning step. Rapid oxidation is equally true when chemical or mechanical abrasive cleaning is used on the foil. Aside from disintegration of the foil therefor, bonding between the foil and tab must occur very shortly after cleaning by old methods if good bonding and electrical conductivity are to be attained. The tearing and actual disintegration of the foil itself, a particularly serious problem with foil thickness less than .001 inch gauge, are eliminated by this invention. Concern over the time factor for rapid oxidation of aluminum is also avoided.

The present invention eliminates the step of etching or abrasive cleaning and permits connection of tabs on foil of less than .001 inch thickness while producing the same or better electrical conductivity between tabs and foil previously attainable only with thicker foils. In addition, mechanical strength of the foil itself is enhanced by addition of a dense or true dielectric film to the surface of both the tab and foil or on only one or the other of the tab and foil.

Figure 1:
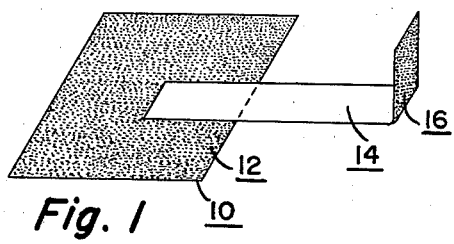
FIGURE 1 is a diagrammatic view of a capacitor foil and tab both uncleaned and purposely coated with a high density dielectric film for connection in accordance with the present invention.

With particular reference to FIGURE 1, a thin aluminum foil, generally indicated by the numeral 10, is shown covered with a high density or true dielectric film of aluminum oxide, generally indicated by the numeral 12. The foil 10 could not be cleaned prior to formation of the dielectric film thereon because of the thickness of the foil which would have been subjected to tearing or disintegration of the aluminum with etching or abrasive cleaning. An aluminum tab, generally indicated by the numeral 14, is shown covered with a high density or true dielectric film of aluminum oxide, generally indicated by the numeral 16. Thus, FIGURE 1 represents the present invention when both tab and foil for a capacitor are covered with a high-density dielectric film found to mechanically strengthen each individually as well as aiding rather than hindering a bond between nascent aluminum as will be explained in further detail below.

Figure 2:
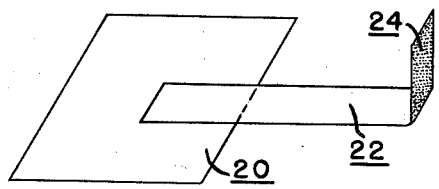
FIGURE 2 is a diagrammatic view of a foil and tab both uncleaned with the tab alone purposely coated with a high density dielectric film for connecting purposes of this invention.

FIGURE 2 schematically represents a non-filmed foil, generally indicated by the numeral 20, to which an aluminum tab, generally indicated by the numeral 22, covered with a high-density, or true, dielectric film, generally indicated by the numeral 24, of aluminum oxide is connectable in accordance with the present invention. The tabs 14 and 22 are shown with a bent-up end portion to illustrate the films 16 and 24, respectively. In FIGURE 2 as in FIGURE 1, the tab and foil were not cleaned abrasively or etched chemically because of tearing and disintegration of the thin gauge metal which would be caused thereby.

Figure 3:
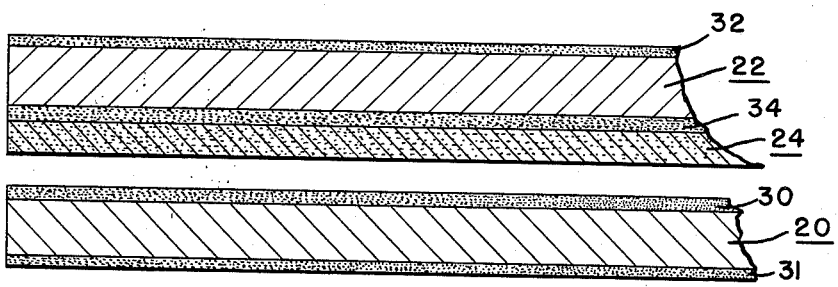
FIGURE 3 is an enlarged cross-sectional elevational view of the tab and foil of FIGURE 2.

FIGURE 3 illustrates in an enlarged cross-sectional view the strata of material present with the tab and foil of FIGURE 2. In FIGURE 3, the aluminum tab 22 has a dirt and naturally formed oxide layer, or material, 32 and 34 on opposite surfaces. The high density dielectric film 24 has been applied to the surface of foil 22 purposely left uncleaned and covered with material 32 and 34 that, under previous methods, would be removed by etching or abrading to attain better electrical conductivity and bonding of a tab to the foil. It is to be understood that the high density dielectric film 24 is shown on one side of tab 22 for clarity. Depending upon the manner of application, the film 24 can be on one side only, as shown, or on both surfaces of the metal so covered. Foil 20, in FIGURE 3, is left uncleaned and covered with material or layers 30 and 31 similar to those on the tab. The foil is so thin that abrasion or etching would cause tearing or disintegration of the foil 20 itself.

Figure 4:
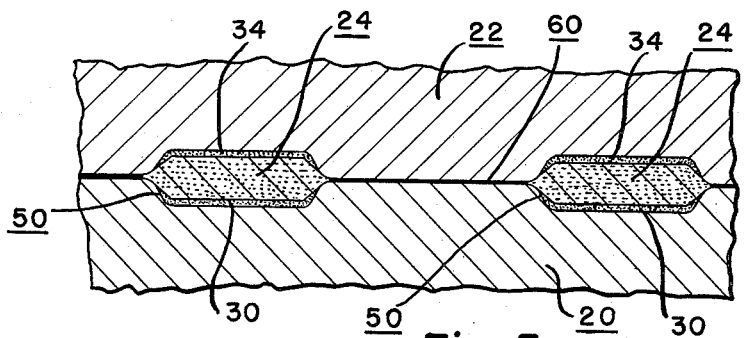
FIGURE 4 is a view representing pressure fusing of the tab and foil of FIGURES 2 and 3.

FIGURE 4 represents pressure fusing of the tab 22 and foil 20 of FIGURE 2 and indicates how the strata of material in FIGURE 3 are affected by the force applied. A tool or roller, generally indicated by the numeral 40, is made movable under a motive force against the foil 20. Motive force may be hydraulically or mechanically applied for transmission by the tool in any well known manner. Preferably, point pressure is applied to the foil and tab relative to a reaction member or table 42 opposite the tool 40 as shown. Pressure is applied through a plurality of small, raised squares or heads exerting force upwards of 50 inch-pounds to a roll where normally seven tons of pressure would be needed to obtain a bond using smooth rolling surfaces. The small raised squares avoid bulging in the foil and tearing of materials. To exert point pressure in this manner, a plurality of projections or lugs 44 with flat head portions 46 are preferably provided on the tool 40. The flat heads may wear slightly in use and, for practical purposes, may be somewhat concave or convex in shape. However, at no time should the projections 44 puncture or tear the foil 20 in localizing the pressure they transmit to closely adjacent areas. The force transmitted by the projections 44 compresses the strata of material with a shattering effect in the film 24 representel by arrows in FIGURE 4 going in many directions. The shattering effect, or dispersal, occurs in a surface area between the tab and foil due to the locally applied external force transmitted between the tool 40 with lugs 44 relative to member 42.

Figure 5:
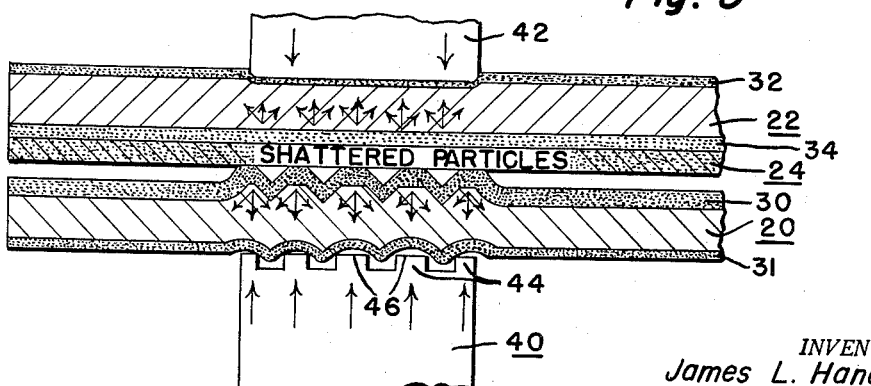
FIGURE 5 is a magnified view of the result of force applied as represented in FIGURE 4.

FIGURE 5 is a fragmentary view taken from FIGURE 4 where shattering of the high density true dielectric film 24 has occurred. Tab 22 and foil 20 are shown partially in magnified proportion and layers 30 and 34 and film 24 have been isolated locally due to force from the tool 40 in effecting the shattering action of film 24. An interlaced structure with pockets, generally indicated by the numeral 50, is formed containing debris of layers 30 and 34 as well as the remains of the shattered film 24. Due to the shattering, a pressure fusion of nascent aluminum, represented generally by the numeral 60, is formed instantaneously along a line between pockets 50 with the high local pressure applied by tool 40. The pressure fusing of nascent aluminum results in a bond attaining high electrical conductivity between the tab and foil as will be set forth from sample test results below. The test results are to be compared with results obtained using old methods for joining tabs to capacitor foil. The layers 30 and 31 on foil 20 and layers 32 and 34 on tab 22 are never removed by abrasive or chemical cleaning. Thus, the layers remain together with the added film 24. This combination of layers and film mechanically strengthens both the tab and foil about the area where a bond is obtained due to pressure fusing of nascent aluminum as at line 60 in FIGURE 5.

It should be understood that the present invention recognizes a distinction between various oxides as formed with aluminum. First, there is an air oxide, or natural, film which forms instantaneously on foil. This air oxide film is the one which generally hinders good electrical conductivity with a secure bond of substantial mechanical strength. The air oxide film is like layers 30, 31, 32 and 34 in FIGURES 3, 4, and 5 of the drawings. This air oxide film forms rapidly with exposure of aluminum to air. This natural film on aluminum is exceedingly thin and highly refractive. The natural film provides a fairly good protection for the underlying metal against many corrosive agents but is mechanically weak and has very poor dielectric characteristics. Good dielectric characteristics are especially important in making capacitors as is well understood. Impurities of aluminum such as iron, silicon, copper as well as traces of magnesium, manganese, titanium and gallium as well as dirt may be evident in this natural film.

Another oxide film can be artificially added to the aluminum which is thicker than the natural film but porous or spongy in structure. Such a film can be formed by any of the methods known in the art. For example, anodic oxidation in sulfuric or oxalic or chromic acid electrolytes may be used. To form this porous type film, a simple immersion treatment in an oxidizing solution such as a hot solution of sodium carbonate containing potassium dichromate can also be used. Oxides formed using chromic and sulfuric acid are not good dielectric films when wet because of the resulting porous structure. Though the thickness of such films may be of the order of .0001 inch and even greater, their dielectric properties are usually poor. Therefore, the anodizing process is used extensively to improve wearing characteristics of aluminum and to protect from corrosion, staining, smudging, tarnishing, and so on. Such coatings being usually porous may even be impregnated with oil or other suitable agents to enhance the corrosion resistance.

Finally, there is the third film which can be contrasted with the porous type as one which is a true dielectric film having a high density structure as formed with the aluminum. A true dielectric film is the one preferably used in the present invention. The test data to be described below for a capacitor tab and foil joined as in the present invention was obtained using a true dielectric film formed by using sodium borate ($Na_2B_4O_7$) in combination with either boric acid, phosphoric acid, or acids of the same type. Phosphoric acid alone gives a spongy type dielectric film but when used with sodium borate, potassium borate, or even ammonium borate or similar borate compounds will react to form a dense, true or nonspongy dielectric film. The aluminum foil or metal being oxidized must be maintained at positive potential so that the negatively charged borate ($B_4O_7$) is attracted to the aluminum rather than the active metal therewith which at negative potential of the aluminum would displace and destroy the aluminum. Aluminum hydroxide is formed as oxygen from the borate reacts with hydrogen from an aqueous mixture used in the filming. Finally, a dry film of aluminum oxide is left as hydrogen and oxygen from the aluminum hydroxide go to the aqueous mixture.

The film formed in a solution of 10% boric acid ($H_3BO_3$), for example, and some of its salts is dense, impermeable to the solution and practically insoluble in it. Generally, the thickness of the film is such as to provide poor protection against corrosion and abrasion but excellent dielectric properties because of density. Sodium borate, usually supplied as $Na_2B_4O_7 \cdot 10H_2O$, may be of the order of 1% of the total weight of the solution. Higher filming voltages call for a solution of greater resistivity and consequently of a smaller percentage of sodium borate. For the highest voltages employed in filming, a straight boric acid solution with no sodium borate may be preferable. Purity of materials in the solution is essential and distilled water is necessary. Exclusion of chlorides from the solution is mandatory because of adverse effect on the quality of the film. Ammonium borate is used as a substitute for sodium borate in the film-forming solution, particularly when filming at high voltages is required.

As is indicated above, the properties of an oxide film vary. Depending upon the film-forming electrolyte chosen, the film will become porous or dense and non-dielectric or dielectric in character, rather flexible or brittle, of appreciable thickness or exceedingly thin, respectively. The film may be contrasted as amorphous or crystalline, anhydrous or hydrated.

In the present invention, the presence of chlorides is adverse to formation of a coating of gelatinous or colloidal aluminum hydroxide. On the other hand, the introduction of colloids like glue, gums, and so on, is considered to be beneficial as they are apt to strengthen the colloidal aluminum hydroxide film. The high-density true dielectric film left is material alumina (aluminum oxide—$Al_2O_3$) that is visibly present, has a very high dielectric constant, and contains very little physically absorbed water. Molecular arrangement of this high density film provides a very good dielectric on the capacitor foil and in applying external force locally to produce a shattering effect, according to the present invention, permits pressure fusing of a capacitor terminal tab to capacitor foil even when the foil is not cleaned prior to the bonding. At the interlaced portions of fusion of nascent aluminum, a composite material is formed, devoid of the aluminum oxide interlayer, wherein a strong coextensive bond is present. The bonding operation occurs simultaneously or substantially simultaneously with the application of pressure. The uncleaned surfaces of the aluminum tab and aluminum foil are subjected to the shattering of the high density true dielectric film so that bonding surfaces are in a more or less nascent condition at the instant of pressure fusing.

*Test Data and Comparison of Results*

To establish a basis of comparison, tests were conducted using various methods for attaching terminal tabs to capacitor foil. Factors to keep in mind during this analysis to show how the present invention attains goals not realized by old methods include the electrical conductivity, mechanical strength of the tab and foil connection, and how the particular tab and foil connection affects physical dimensions of the parts determining overall physical and electrical capacitor size. Various old methods of attaching terminal tabs to capacitor foil can be used to attain a connection with physical strength but poor electrical conductivity at the bonded area therebetween.

The first comparison, therefore, involves a relation of mechanical strength to electrical conductivity. As a measure of electrical conductivity it is most practical in the laboratory to measure electrical resistance in ohms using identical pieces of tab and foil of aluminum. A smaller resistance then indicates high electrical conductivity and larger resistance indicates poor electrical conductivity. In compiling the following test data, an aluminum foil having a width of three inches and a thickness of .0005 inch was used. An aluminum tab having a width of 5/16 inch and a thickness of .008 inch was connected to the foil. The resistance of .0005 inch x 3″ foil per lineal foot is .011 ohm. Keeping all sizes the same and measuring in the same way, the resistance from the tab to the foil for each sample connection will result in a constancy in conditions affecting the electrical and mechanical connection between the tab and foil. The same Kelvin bridge was used providing the same arbitrary current and voltage across each tab and foil connection to assure further duplication of conditions in measuring resistance for each of the following samples. All other conditions being constant, a comparison of resistance values indicates electrical conductivity achieved with the various connections.

The first sample tested used tab and foil of the above dimensions. The tab was folded into engagement with the foil as though a capacitor foil were being wrapped to form a capacitor with a terminal tab connected thereto. No pressure was applied to connect the tab and foil across the fold. The following ten readings were tabulated giving the resistance in ohms:

Folded tab connection, no pressure across fold:

| | |
|---|---|
| .0082 ohm | .0082 ohm |
| .0091 ohm | .0087 ohm |
| .0081 ohm | .0093 ohm |
| .0096 ohm | .0091 ohm |
| .0084 ohm | .0083 ohm |

The average of these ten readings has been calculated to be .00870 ohm for the folded tab connection. The foil used in the folded tab connection was uncleaned because .0005 inch thickness of foil would tear or disintegrate if cleaned. No aluminum oxide film was added in accordance with the present invention with this first sample. Quite obviously the folded connection can easily fall apart because there is no positive bond between the tab and foil. Electrical conductivity is poor as will be seen by comparison with the following additional results.

The second sample tested involved uncleaned but non-filmed foil and tab like the first sample except that a more positive mechanical connection was made by stitching. Pressure of the stitch was 2560 p.s.i. The following ten readings were tabulated giving resistance in ohms:

Non-filmed foil and non-filmed tab stitched at 2560 p.s.i.:

| | |
|---|---|
| .0058 ohm | .0053 ohm |
| .0052 ohm | .0052 ohm |
| .0057 ohm | .0066 ohm |
| .0049 ohm | .0059 ohm |
| .0061 ohm | .0047 ohm |

The average of these ten readings has been calculated to be .00554 ohm for the connection of non-filmed foil and non-filmed tab stitched at 2560 p.s.i. Again thickness of the material involved was such that chemical or mechanical cleaning could not be used. The resistance of .00554 ohm average is appreciably less than .00870 ohm average for the first sample. Better electrical conductivity resulted from using the stitching. However, stitching perforates the materials joined and results in a tearing which necessarily weakens the mechanical strength of the tab and foil at the connection. In the first and second samples there has been no filming in accordance with the present invention. Both tab and foil have been left uncleaned in a natural state.

The third sample tested used the same size of foil and tab as before except that both the foil and tab were filmed in accordance with the present invention. A positive mechanical connection was again made by stitching at a pressure of 2560 p.s.i. This pressure was the actual pressure on the connection for mechanical stitching but did not effect a fusion of nascent aluminum as in the present invention. The following ten readings were tabulated giving resistance in ohms, for the third type of sample:

Filmed foil and filmed tab stitched at 2560 p.s.i.:

| | |
|---|---|
| .075 ohm | .075 ohm |
| .068 ohm | .077 ohm |
| .047 ohm | .063 ohm |
| .059 ohm | .081 ohm |
| .062 ohm | .090 ohm |

The average of these ten readings has been calculated to be .0697 ohm for the stitched connection of filmed foil and filmed tab. It is apparent that the film has affected electrical conductivity adversely when mechanical connection between the tab and foil is by stitching. The resistance of .0697 ohm is far worse than the .0054 ohm of the second sample with stitching and is even worse than the .00870 ohm of the first sample with the folded tab. Again the mechanical strength of the foil and tab connection suffers from the puncture in stitching the materials. Thus, in all of the first three samples, old methods of joining the capacitor tab and foil have not achieved optimum mechanical strength, simultaneously with good electrical conductivity.

The fourth sample tested used tab and foil both with the dimensions of the first three samples and filmed as in the present invention and in the third sample. Pressure was exerted on the foil and tab as represented and explained in the drawings and specification for FIGURES 4 and 5. The result was a pressure fusion of nascent aluminum due to the shattering of the high-density true dielectric film dispersing material as explained in the specification. The following ten readings were tabulated giving resistance in ohms for the fourth type of sample which was in accordance with the present invention:

Filmed foil and filmed tab pressure fused by present invention:

| | |
|---|---|
| .0035 ohm | .0034 ohm |
| .0036 ohm | .0020 ohm |
| .0034 ohm | .0022 ohm |
| .0022 ohm | .0027 ohm |
| .0028 ohm | .0037 ohm |

The average of these ten readings has been calculated to be .00295 ohm indicating the best electrical conductivity of any of the samples. In addition, the mechanical strength of the connection between the tab and foil is superior to that obtained with the old methods. There was no tearing or disintegrating of the foil or tab due to stitching, chemical etching or mechanical abrasive cleaning or brushing. There was no rush involved in joining the tab to the foil to beat natural oxidation of the aluminum. The filming was purposely put on the surface area to be joined and effected a bond due to shattering of the high density true dielectric film which dispersed uncleaned dirt and film from the aluminum for a nascent metal to metal bond as described above.

A laboratory test showed that mechanical brushing or chemical etching of .0005 inch foil caused such weakness and disintegration of the foil that, even if a tab were attached to the foil, the mechanical strength was so lacking that the foil could not even support the weight of the tab itself. Since the foil could not support the weight of the tab alone, it is obvious that any method of attaching an aluminum tab to an aluminum foil involving a cleaning step is unsuitable for the thickness of materials involved. However, it would be helpful to compare the results in terms of electrical conductivity achieved using a method including a cleaning step as opposed to the electrical conductivity achieved in the present invention eliminating the cleaning step.

Therefore, a second comparison was made using a foil thickness capable of withstanding etching or abrasive cleaning. With this second comparison, tools of the type represented by FIGURE 4 of the drawings were used for making the connection between the tab and foil thereby making a constant of the mechanical pressure applied as well as of the dimensions of the aluminum foil and tab joined. Obviously, all other matters being equal or constant, the comparison will highlight electrical conductivity between the tab and foil.

First, using non-filmed foil and a non-filmed tab, but not cleaned, by chemical or abrasive action, the tools of the type in FIGURE 4 provided a poor mechanical connection. This lack of pressure fusion of nascent aluminum was expected.

Second, using abrasively cleaned samples of the same dimensions in the same tools, there was again a poor bond in spite of the fact that the cleaning was accomplished within five seconds or so of the actual attempted pressure fusion of tab and foil. The time factor was crucial because of the well-known rapid oxidation of aluminum alluded to herein before.

Third, using a filmed tab and filmed foil as in the present invention shown in FIGURE 1, an excellent mechanical connection was achieved using tools of the type in FIGURE 4.

Fourth, using a filmed tab and non-filmed foil as in the present invention shown in FIGURE 2, an excellent mechanical connection was achieved using the tools of the type in FIGURE 4.

The electrical connection on all of the above methods using the tools of the type in the present invention was excellent. Six samples of each type were tested on a Wheatstone bridge with all results falling between .002 and .003 ohm, resistance. A check of a similar length of foil alone shows an almost identical resistance. This proves the connection itself has an infinitely low resistance and excellent electrical conductivity. Therefore, the samples of filmed tab-filmed foil and filmed tab-unfilmed foil both have excellent electrical conductivity due to pressure fusion of nascent auminum and good mechanical strength simultaneously. The electrical conductivity is the same or better than with cleaned surfaces.

The high density, true dielectric film used for the purpose of pressure fusing aluminum terminal tabs to the aluminum foil for capacitors in accordance with the present invention thus strengthens the tab and foil adjacent the bond and shatters to expose nascent aluminum for a good bond of high electrical conductivity. These remarkable results are attained simultaneously by a method eliminating the step of cleaning and purposely filming a high density dielectric oxide onto aluminum.

Briefly, the advantages of the process in the present invention for joining aluminum tabs to aluminum foil for capacitors include the following points:

(1) The present invention provides the best possible electrical connection between tab and foil.

(2) This process which eliminates the cleaning step is proven to weaken the foil strength the least and actually enhances the mechanical strength by adding a high density, true dielectric film.

(3) The present invention eliminates the tab-foil connection disadvantages where foil is thinner than .001 inch thickness, such as in a range of between .0008 inch to .00017 inch thickness (.0005 inch in examples).

(4) Pressure fusion of nascent aluminum for a bond of good mechanical strength and electrical conductivity is helped, not hurt, by the addition of a dielectric oxide.

(5) Since any bond has greater mechanical strength when pressure fused areas are dry, the present invention assures dryness of the nascent aluminum due to the non-porous dielectric filming as described, completely avoiding residue of pickling solutions of acids used with old methods.

(6) The present invention permits use of thin foil with capacitor tabs where cleaning is not feasible as required by previously known pressure fusion methods.

The practical result of the present invention applied to capacitor manufacture is emphasized by analyzing the ratio of real power consumed due to real impedance in the form of resistance compared to reactive value or capacitance to be provided by the finished capacitor. For example, using .0005 inch x 3 inch foil having a resistance per lineal foot of .011 ohm per lineal foot, on a 40 foot length capacitor of 482 mfd. at 110 v. A.C., with tab affixed at the end such as in a folded tab, the resistance due to the length of foil would add 59.77 watts to the circuit. This increases the power factor of the capacitor by 2.72% reflected as an unwanted heat loss due to poor electrical conductivity and higher connection resistance. By using the pressure fusion method of the present invention at the mid-way point of the same length of the same capacitor foil, only 15.74 watts would be added to the power consumed in the circuit increasing the power factor of the capacitor by only 0.715%. While it is true that the stitched tab placed midway on the foil also eliminates the power factor problem in a manner similar to the pressure fused tab of the present invention, the stitched tab does so at the expense of losing nearly a half of the strength of the foil and developing over twice the heat loss at the tab connection. Thus, with the pressure fusion of the present invention, a capacitor can be manufactured having twice the length of foil wrapped in a conventional manner. For example, 34 feet of capacitor foil of thinner gauge, such as .0005 inch thickness, can be wrapped to the same overall physical capacitor dimensions instead of 17 feet of capacitor foil of .001 inch thickness. Thus, electrically, the capacitor size can be greater without greater physical overall dimensions and there is less resistance causing heat loss from the tab and foil juncture.

Furthermore, the present invention can be carried out at relatively cold operating temperatures because there is appreciably no heat fusion detrimental to foil and tab. The present invention involves pressure fusion of nascent aluminum due to addition of a high density, true dielectric film which is shattered to effect a bond as described.

While the embodiments of the present invention as herein disclosed constitute a preferred form, it is to be understood that other forms might be adopted.

What is claimed is as follows:

1. A method of connecting a natural oxide coated aluminum tab surface to a natural oxide coated surface of aluminum foil having a thickness ranging between .0008 inch and .00017 inch for use in a capacitor comprising the steps of adding a dense brittle high dielectric constant film to at least one of said natural oxide coated surfaces, aligning a portion of said tab on said foil with said dense brittle high dielectric constant film disposed therebetween, and applying sufficient pressure to said aligned surfaces to shatter and disperse said dense brittle high dielectric constant film causing the shattered particles of said dense brittle high dielectric constant film to penetrate and facilitate removal of the natural oxides exposing cooperating nascent aluminum areas of said natural oxide coated surfaces and said pressure simultaneously bonding these areas forming a rigid low resistivity electrical connection between said tab and said foil.

2. In cold pressure welding an aluminum member having a natural thin oxide surface film on the surface thereof resulting from normal exposure of the metal to air to a second aluminum member, the art which includes providing a second aluminum member with a friable, adherent surface oxide film formed by anodizing and having a thickness of at least about 0.00010 inch, superimposing said members with their films face to face, and cold deforming said members by applying pressure across said members and films until shattering of said films occurs and plastic flow and bonding of the adjacent members are promoted.

3. In cold pressure welding of a first and second aluminum member to one another wherein each member has a coextensive, extremely thin, natural aluminum oxide film on the surfaces thereof, the art which includes forming a friable, adherent, oxide film superimposed upon said thin natural oxide film on one of said members, superimposing said members with the friable, adherent oxide film on said one member in face-to-face contact with the natural oxide film on the other member, and then cold forming said members by applying pressure across said members and films until shattering of said films occurs and plastic flow and bonding of the adjacent portions of said members is promoted.

References Cited in the file of this patent

UNITED STATES PATENTS

| | | |
|---|---|---|
| 2,088,949 | Fekete | Aug. 3, 1947 |
| 2,763,057 | Clair | Sept. 18, 1956 |

FOREIGN PATENTS

| | | |
|---|---|---|
| 678,610 | Great Britain | Sept. 3, 1952 |